April 5, 1966     M. P. HNILICKA, JR     3,244,224

SPACE VEHICLE INSULATION

Filed Dec. 18, 1961

INVENTOR.

Milo P. Hnilicka, Jr.

BY Oliver W. Hayes

Edward A. Gordon

United States Patent Office 3,244,224
Patented Apr. 5, 1966

3,244,224
SPACE VEHICLE INSULATION
Milo P. Hnilicka, Jr., Concord, Mass., assignor to National Research Corporation, Cambridge, Mass., a corporation of Massachusetts
Filed Dec. 18, 1961, Ser. No. 160,193
7 Claims. (Cl. 165—32)

This invention relates to insulation for maintaining an object in space at a temperature widely different from the ambient temperature near absolute zero existing in space or to shield the object from solar radiation. This application is in part a continuation of my copending application S.N. 842,139, filed September 24, 1959, now Patent 3,018,016.

A principal object of the present invention is to provide a novel insulation particularly adapted for use on spacecraft where the craft is to operate outside the earth's atmosphere and wherein the weight of insulation for the craft is considerably less than that embodied in presently available commercial insulations.

Another object of the invention is to provide an insulation which has a minimum $K\rho$ product and which is simple to apply to the spacecraft.

Another object of the invention is to provide such an insulation which is rugged and can withstand the high acceleration forces encountered in launching and landing a spacecraft.

Other objects of this invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings wherein.

Figure 3:
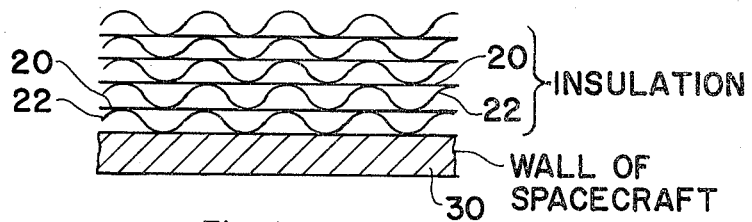
FIG. 3 is a sectional, fragmentary view of a portion of a spacecraft insulated by the present invention.

Presently available insulation for spacecraft often involves bulk insulation such as silica gel and the like. Such insulation is relatively bulky, heavy and expensive. It has been discovered that considerable savings in both space and weight of insulation of such a spacecraft can be accomplished by the present invention.

In general, the objects of the present invention are achieved by providing around the portions of the spacecraft to be insulated a plurality of layers of metal-coated, nonmetallic thin plastic sheet substrate having only point contact between the layers. It has been discovered that such metal-coated, plastic substrates can be maintained in their operating relationship without any requirement for separate spacing means. The substrate is preferably on the order of ¼ mil in thickness and is crinkled, crumpled or otherwise deformed to provide only spaced-apart point contact between adjacent layers.

Each thin layer comprises a very thin metallic coating and the very thin nonmetallic substrate has a very low lateral conductivity (i.e., there is high resistance to conductance of heat in the plane of the substrate) and extremely low mass per unit area. Accordingly, a great many of these very thin layers can be placed in a small space to provide a large number of radiant heat shields having extremely low bulk density and low heat capacity. Provision for only point contact may be achieved, for instance, by corrugations or crinkles in the sheet material, and successive layers may be disposed as loose wrappings in a generally concentric relation. Since no separate spacers are required, the bulk density and heat capacity of the insulation is only that of the extremely thin substrate with its almost negligibly thin layer of metal coating.

The substrate must be capable of remaining under vacuum for long periods of time without suffering damage, so should not contain volatiles which can be slowly released to the high vacuum of outer space. It is desirable that the nonmetallic sheet material be economical to vacuum coat and be adapted to promote an extremely shiny coating. Accordingly, preferred substrates are organic plastic films which are free of volatile plasticizers. The plastic should, therefore, contain no material having an equilibrium vapor pressure at 20° C. in excess of 10 microns Hg abs. Particularly satisfactory materials are the polyester resins. A sheet of polyethylene terephthalate .25 mil thick has a lateral conductivity per square of less than $1 \times 10^{-6}$ watt/° K. The metal coating on the plastic substrate preferably has a thickness less than a few microinches (e.g. 0.5 microinch) so as to provide only slight lateral conduction in the plane of the metal coating. However, this metal coating is sufficiently thick so as to have an emissivity of less than .06. An aluminum film of $0.5 \times 10^{-6}$ inches has a sufficiently low lateral heat conductivity per square (about $3.8 \times 10^{-6}$ watts/° K. at 300° K.) and the substrate on which the metal is deposited is sufficiently thin to give a suitable lateral heat conductivity per square to the composite, metal-coated substrate of about $4.75 \times 10^{-6}$ watts/° K. at 300° K.

The variation in lateral conductivity as a function of temperature is illustrated in Table 1.

Table 1

| Material | Lateral Conductivity per square as watts/° K. | | |
|---|---|---|---|
| | 300° K. | 77° K. | 20° K. |
| A. ¼ mil aluminum | $1.91 \times 10^{-3}$ | $2.54 \times 10^{-3}$ | $25.4 \times 10^{-3}$ |
| B. ¼ mil polyethylene terephthalate | $.9 \times 10^{-6}$ | $.858 \times 10^{-6}$ | $.533 \times 10^{-6}$ |
| C. ½ microinch aluminum | $3.83 \times 10^{-6}$ | $5.1 \times 10^{-6}$ | $51 \times 10^{-6}$ |
| D. Composite B+C | $4.75 \times 10^{-6}$ | $5.98 \times 10^{-6}$ | $51.53 \times 10^{-6}$ |

The critical importance of having a thin metallic layer, particularly near the cold surface, can be appreciated when one observes the great increase in conductivity of the metallic layer with decreasing temperature.

A number of layers of this metal-coated substrate is provided adjacent the portion of the spacecraft to be insulated. Sufficient room is provided in the space in which the metallized substrate is positioned so that there will be some distance between each of the layers and only spaced-apart point contact will be provided between the face of one layer to the face of the next. In order to provide uniformity of construction, alternate layers of metallized substrate may be crimped to provide this point contact. A total thermal conductivity across the insulation of less than 1 microwatt/cm.° K. is thus provided with the temperature of one side of the insulation is below 100° K.

In one preferred embodiment of the invention, the substrate is formed of polyethylene terephthalate film .00025 inch thick having an aluminum film applied to one surface thereof. In the preferred embodiment, this aluminum film is applied by vacuum vapor deposition techniques well known in the art. The aluminum surface of such a product is extremely shiny and has an emissivity of about .04 to .05.

Polyethylene terephthalate has been found to be eminently satisfactory, particularly when the radiant heat barrier is not subjected to temperatures substantially in excess of room temperature. When high temperatures are to be encountered, then it is preferred that there are employed the more heat stable materials such as the fluorinated polymers (e.g. polymers of tetrafluorethylene). From the standpoint of economy, aluminum is a preferred coating metal, although gold, silver, copper, tin and other metals of low emissivity can equally be employed. It is desired that the metal coating have an emissivity of less than .06 and that the lateral conductivity per square of a metallized plastic of .25 mil be less than $10 \times 10^{-6}$ watts/° K. at 300° K. This is about 200 times lower than the lateral conductivity of aluminum foil of equal thickness.

In a preferred embodiment of the invention, as mentioned previously, the nonmetallic sheet material is a plastic, and the plastic is preferably of extreme thinness such as .25 mil as illustrated in Table 1. Such a plastic, when vacuum coated with a microinch, or less, of aluminum, has an extremely low lateral conductivity so that, even though there may be many points of contact between adjacent layers of metallized plastic, the lateral conductivity is sufficiently low that little heat can be transferred in a layer to any of the spaced-apart point contacts of its face with the face of an adjacent layer. Therefore, the successive layers retain their separate identities from a heat transfer standpoint. Thus, each layer can assume an equilibrium temperature condition, incrementally different from the next adjacent layer to serve as a radiation heat shield in accordance with the Boltzman law.

In applying the metallized layers to the insulation space, these layers are preferably crimped or crumpled to provide the spaced point contact between the faces of adjacent layers. It is also very important that not too many layers be jammed into a given space, since the number of points of contact between the layers then becomes sufficiently great that the number of conductive paths so created overcomes the increased radiation barrier effect and actually decreases the effectiveness of the overall insulation.

In this connection it is preferred that the layers be applied so that there are less than 30 layers per inch when the layers are under no atmospheric compression. This provides a minimum $K\rho$ product of less than about .02, where K is $\mu$w./cm.° K. for 300° K./77° K. boundaries $\rho$ is bulk density in g./cc. Naturally, the above loose arrangement of layers can be somewhat compressed in certain limited portions of the insulated surface without drastically effecting the overall heat leak so long as the major portion of the insulation has the low density and the more compressed portions are not compressesd to densities much greater than 300 layers per inch.

Figure 1:
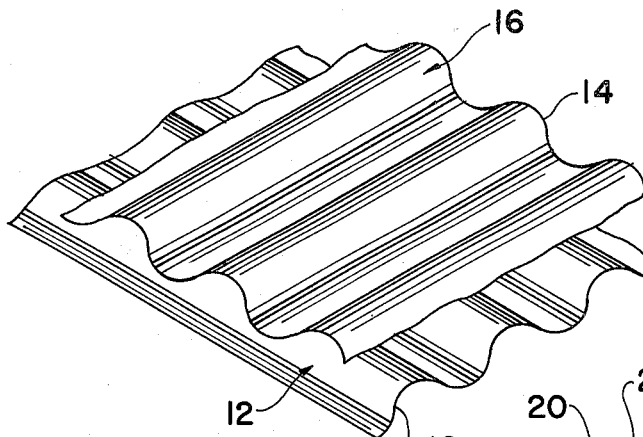
FIG. 1 is a diagrammatic, schematic view on one embodiment of the invention.

One preferred method of assuring the maintenance of the requisite low number of layers per inch of insulation thickness is to provide pairs of layers of insulating material so arranged so that each pair normally will take up much more space than the sum of the thicknesses of the two layers. This can be accomplished by systematic crinkling, for example, along lines which make substantial angles to each other in the two layers to provide a maximum bulk for each pair of layers. This arrangement is shown in FIG. 1 wherein 2 layers of insulation are shown, a portion of the top layer being cut away to illustrate the angular relationship of the regularly arranged wrinkles in the two layers. In the bottom layer 12, for example, the ridges 12 extend up and down the drawing while in the upper layer 14, the ridges 16 extend at an angle of 90° with respect to the lower ridges 12.

Figure 2:
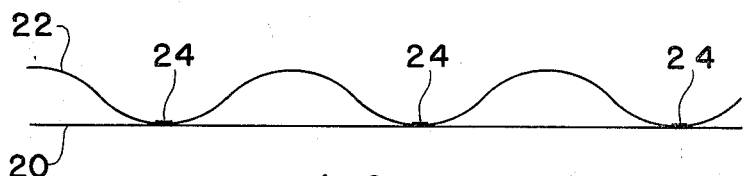
FIG. 2 is a diagrammatic, schematic view of another embodiment of the invention.

In another ambodiment of the invention, shown in FIG. 2, a pair of layers 20 and 22 is provided. In this case the bottom layer 20 is secured to the upper layer 22 at spaced points 24 such as by heat sealing. Since the upper layer 22 is longer than the lower layer 20, there is provided a quilted effect which will furnish a considerable bulk to a very few layers.

The arrangement of layers shown in FIGS. 1 and 2 provides a resilient structure which can withstand high "g" loadings, high atmospheric pressure while on the ground, and other compressive forces which normally will not be in existence when the spacecraft is in orbit or traveling in interplanetary space. When the craft is in the high vacuum and zero gravity condition of space the resilience of the layers will provide separation thereof to give a plurality of layers of metallized plastic insulation having a packing factor of less than 30 layers per inch of insulation thickness. This provides a very low $K\rho$ product and thus forms an optimum insulation with a minimum of weight.

In FIG. 3 there is illustrated a section of a wall 30 of a spacecraft having a plurality of pairs of layers 20 and 22 of the type shown in FIG. 2 covering the wall 30. While only five pairs of layers are provided, such a structure can limit the radiant heat loss from wall 30 (at 300° K.) to less than 1 B.t.u./hr./ft.$^2$ when radiating to the 0° K. of space.

Figure 4:
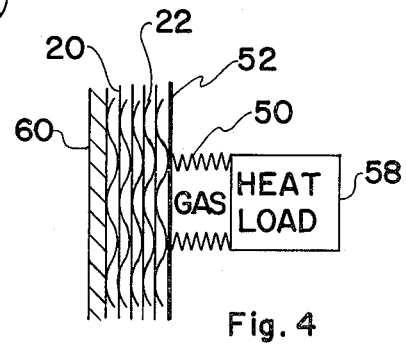
FIG. 4 is a sectional, fragmentary view of another embodiment of the invention.

If desired, the heat transfer rate through the insulation can be modified by compressing the insulation. This example of the invention is illustrated schematically in FIG. 4 and is achieved by expansion of a gas as the temperature of the gas rises. This gas is confined in a bellows 50 whose expansion is transmitted directly to a pressure plate 52 which presses the insulating layers 20–22 together against a backing plate 60. With this arrangement, the greater the compression of the layers, the greater the transmittal of heat through the layers. Conversely, when the temperature being controlled is too low the gas pressure will fall, the compression of the insulation will be lessened and the heat flux through the insulation will decrease. Clearly, other temperature-responsive devices can be employed for varying the compression of the insulation. One such alternative is the use of a bimetallic element whose shape changes as a function of temperature. In FIG. 4 the heat load is shown schematically at 58 as being concentrated, although it clearly can be numerous different sources of heat (and/or heat loss) whose net heat flux is to be controlled.

The effectiveness of compressing the insulation to control the rate of heat transfer is clearly illustrated by considering the results achieved by measuring the heat transfer across 100 layers of crinkled metallized polyethylene terephthalate having a variable packing factor. When the packing factor is about 60 layers per inch, the heat flux is on the order of 20 microwatts/cm.$^2$. At 160 layers per inch the heat flux is over 50 microwatts/cm.$^2$ and at a compression of over 300 layers per inch, the heat flux is in excess of 250 microwatts/cm.$^2$. Thus by compressing the insulation to a thickness of about one-ninth its original uncompressed volume, the heat transfer rate is increased by more than ten times.

While several preferred embodiments of the invention have been described above, numerous modifications can be practiced without departing from the spirit of the invention. For example, if portions of the insulation are to be exposed to high temperatures, such portions can include additional layers of metallized material particularly adapted for the higher temperature. In this case, the inner layers, further removed from the higher temperature, can be of the preferred metallized polyethylene terephthalate.

The invention can be also utilized in conjunction with other temperature control devices. For example, when a portion of the spacecraft is facing the sun, the insulation can be moved aside to permit solar heat to reach the spacecraft if heat energy is needed in the spacecraft. Similarly, the insulation can be removed if it is desired to radiate more heat to outer space to remove excess heat from the spacecraft.

Since certain changes may be made in the above apparatus without departing from the scope of the invention herein involved, it is intended that all matter contained in the above description, and shown in the accompanying drawing, shall be interpreted as illustrative and not in a limiting sense.

What is claimed is:

1. A space vehicle component having insulation for preventing heat transfer between said component and surrounding space existing at a greatly lower temperature and at a pressure less than $1 \times 10^{-5}$ Torr, said insulation comprising a heat transfer barrier disposed around at least portions of said object, said heat transfer barrier comprising a plurality of layers of metal-coated plastic thin sheet material, the metal coating on the sheet material having a thickness less than 10 microinches and an emissivity of less than .06, said thin metal coating and the plastic sheet material of each layer providing a low lateral heat conductivity characteristic to said layer, said layers being disposed together in a generally face-to-face relationship, and being held generally apart through spaced-apart point contacts between adjacent layers, said plurality of layers comprising at least two pairs of layers, each pair of layers comprising a first layer provided with a plurality of parallel corrugations, and a second layer, the two layers of a pair being bonded together at spaced points to provide a quilted effect for the first layer when the second layer is stretched taut in a plane.

2. An insulated component of the type described in claim 1 wherein means are provided for compressing a portion of the insulation to controllably increase transfer of heat through said compressed portion.

3. An insulated component of the type described in claim 1, the first layer of each pair being corrugated and the said second layer of each pair also being corrugated in a direction transverse to the corrugation of the said first layer with the ridges of each layer thereby making substantial angles to ridges of the adjacent layer to provide a minimum packing factor for the insulation.

4. An insulated component of the type described in claim 1 having a K$\rho$ product of less than .02 where K is $\mu$ w./cm..° K. for 300° K. to 77° K. boundaries and $\rho$ is bulk density in g./cc.

5. A space vehicle component having insulation for controlling heat transfer between said component and surrounding space at a temperature greatly different from the temperature of the object and at a pressure less than $1 \times 10^{-5}$ Torr, said insulation comprising a heat transfer barrier disposed around at least portions of said object, said heat transfer barrier comprising a plurality of layers of metal-coated-plastic thin sheet material, the metal coating on the sheet material having a thickness less than 10 microinches and an emissivity of less than .06, said thin metal coating and the plastic sheet material of each layer providing a low lateral heat conductivity characteristic to said layer, said layers being disposed together in a generally face-to-face relationship, and being held generally apart through spaced-apart point contacts between adjacent layers, said plurality of layers being sufficiently loosely held and having sufficient resiliency to provide a low packing factor when the layers are under no compression, and means mounted on said space vehicle and operatively connected to the heat transfer barrier for applying a variable compression to said layers to provide a variable heat transfer through said insulation.

6. The component of claim 5 wherein the means for varying the compression of said layers is arranged to compress the insulation to a thickness less than one-third its uncompressed thickness.

7. The component of claim 5 wherein the means for varying the compression of said layers is controlled by a temperature-sensing device.

References Cited by the Examiner

UNITED STATES PATENTS

| | | | |
|---|---|---|---|
| 1,934,174 | 11/1933 | Dyckerhoff | 161—129 |
| 2,222,343 | 11/1940 | Wasserman | 161—129 |
| 2,875,087 | 2/1959 | Crandon | 117—138.8 |
| 2,992,125 | 7/1961 | Fustier | 117—107 |

ROBERT A. O'LEARY, *Primary Examiner.*

CHARLES SUKALO, *Examiner.*